Figure 1:
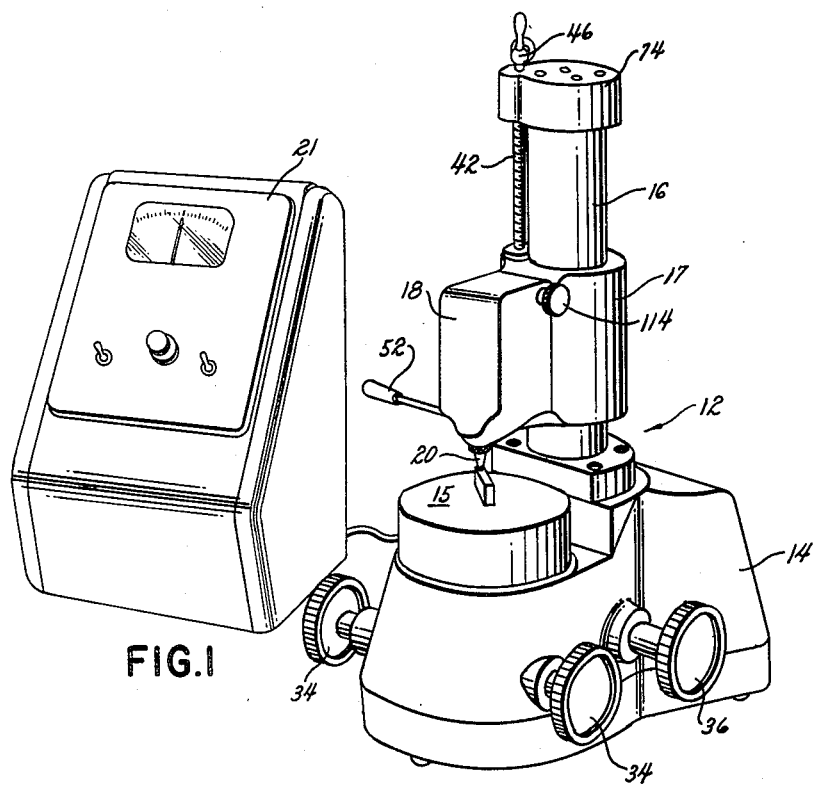

Feb. 9, 1960  R. A. MAHLMEISTER ET AL  2,924,018
GAGING DEVICE
Filed April 3, 1958  4 Sheets-Sheet 1

INVENTORS
Raymond A. Mahlmeister
Jesse H. Straw
BY Ernest J. Nix
ATTORNEY

United States Patent Office 2,924,018
Patented Feb. 9, 1960

2,924,018
GAGING DEVICE

Raymond A. Mahlmeister and Jesse H. Straw, Dayton, Ohio, assignors to The Sheffield Corporation, Dayton, Ohio, a corporation of Delaware Application April 3, 1958, Serial No. 726,105

16 Claims. (Cl. 33—147)

This invention relates to devices for measuring or comparing article dimensions and particularly to such devices of extremely high precision.

It is an object of this invention to provide a comparator gage particularly useful in laboratory applications for measuring gage blocks and other articles of high precision, the comparator having features of simplicity and ruggedness in construction, and for ease and accuracy of adjustment and application.

It is a further object to provide such a comparator including an adjustment for relatively moving a gage head and work supporting table through predetermined incremental displacements for rapid set-up adjustments as, for example, those involved in gaging the blocks of a gage block set having nominal differences in dimension.

It is a further object to provide such a comparator including a rotatable screw drive for adjustably positioning a gage head relative to a work supporting table or anvil, a lever and ratchet drive being operative to rotate the screw for incremental adjustments and an additional independently operative adjustment being operative for rotating the screw for desired relative positioning.

It is a further object to provide such a comparator wherein an article supporting table is precisely adjustable for set-up purposes to position an article carried thereby relative to a gage head supported above the table, provision being made for obtaining incremental adjustment of predetermined magnitudes of the gage head relative to the table and article to be measured for rapid set-up and adjustment for different parts or articles.

It is a further object to provide such a comparator including fine and coarse table adjustment means for rapid preliminary gaging adjustments ruggedly and precisely supported in the base of the gage, whereby precise coarse and fine positioning means are provided at a readily accessible location providing rigidity against deflection of gaging components through adjustment forces.

It is a further object to provide such fine and coarse adjustments including a lever and follower cooperating between the base and table, first and second independently adjustable cam means being in supporting engagement with said lever at different distances from said follower, each of said cam means being independently operated for pivoting the lever about the other whereby both fine and coarse positioning of said table and an article supported thereby are obtained through a simple, reliable, and rugged structure.

It is a further object to provide a gage head particularly useful in such comparators having a precise resilient control of the work engaging pressures of a movable work contactor and features for adjustment and reliable operation in precision gaging.

Other objects and advantages of this invention will be apparent from the accompanying description, the appended claims, and the accompanying drawings, in which, Figure 1 illustrates in perspective a comparator embodying features of the present invention shown connected to an indicating instrument.

Figure 2:
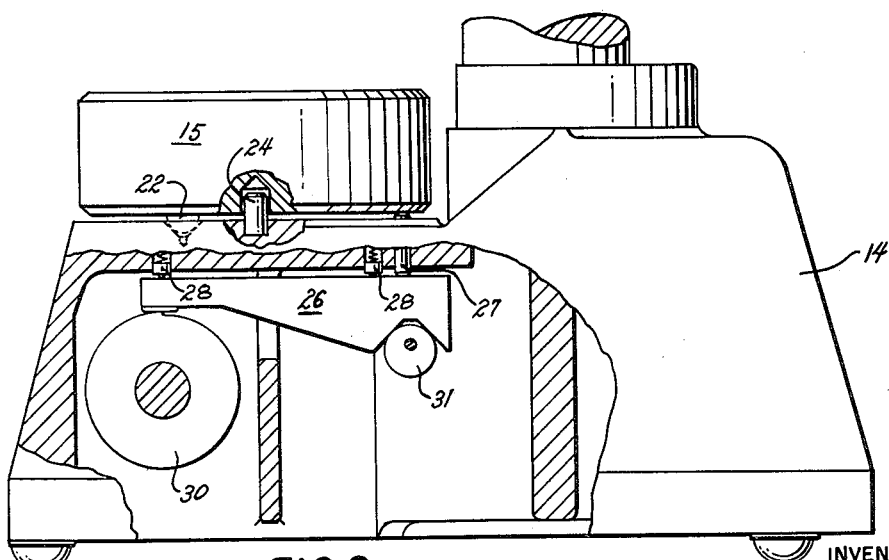
Figure 3:
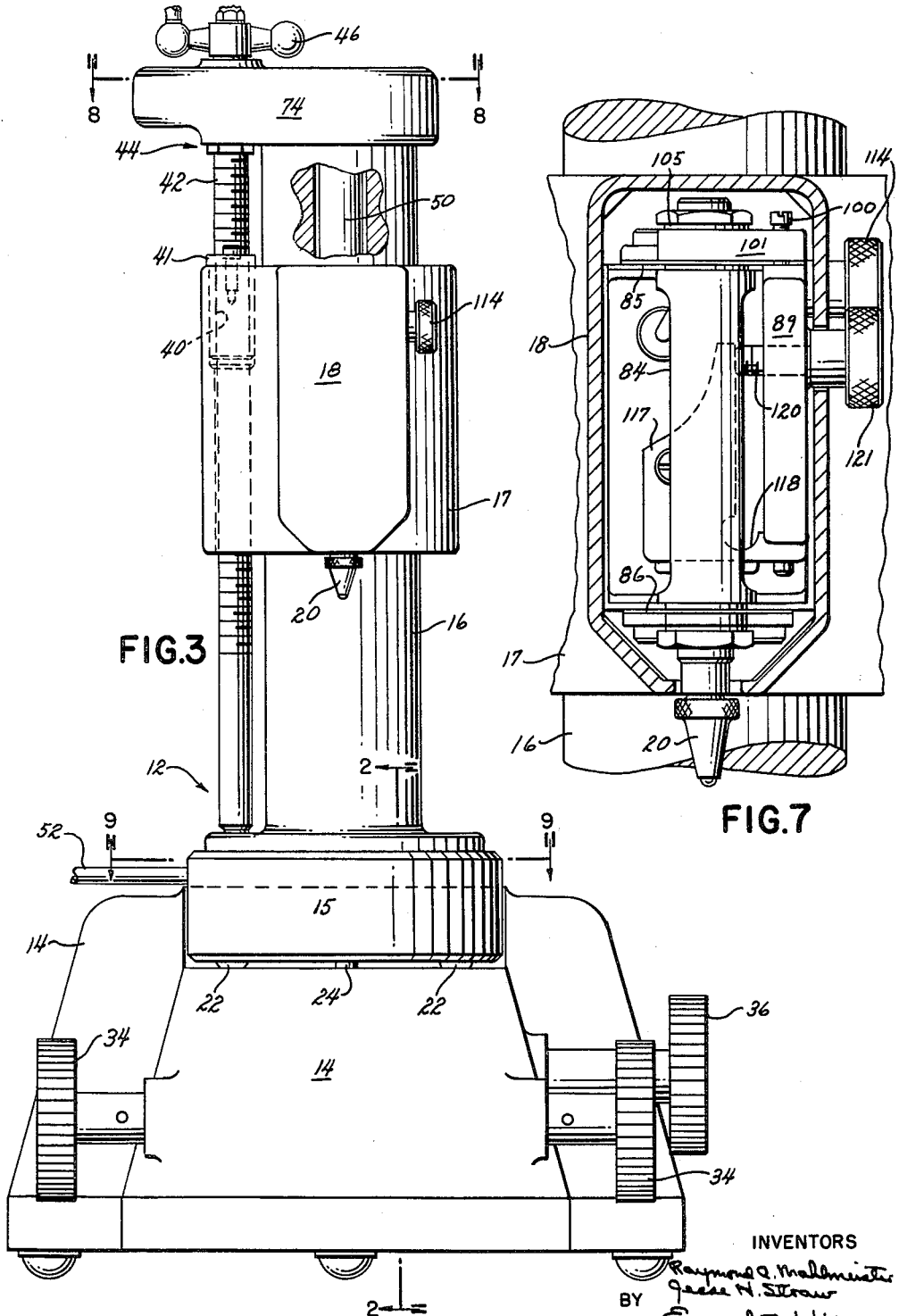
Figure 4:
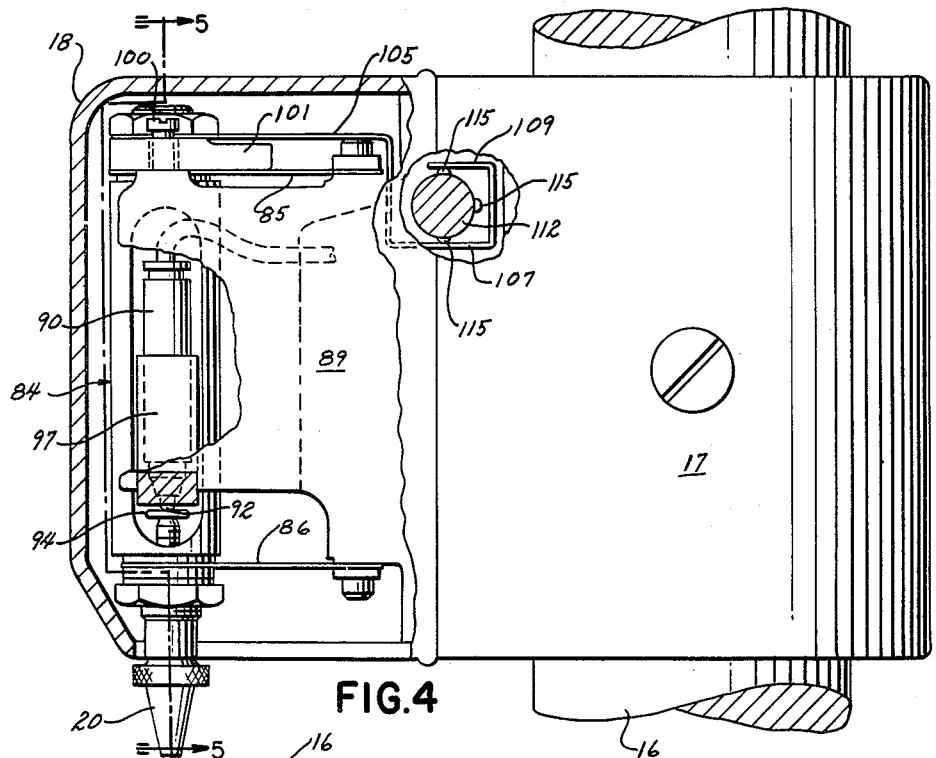
Figure 5:
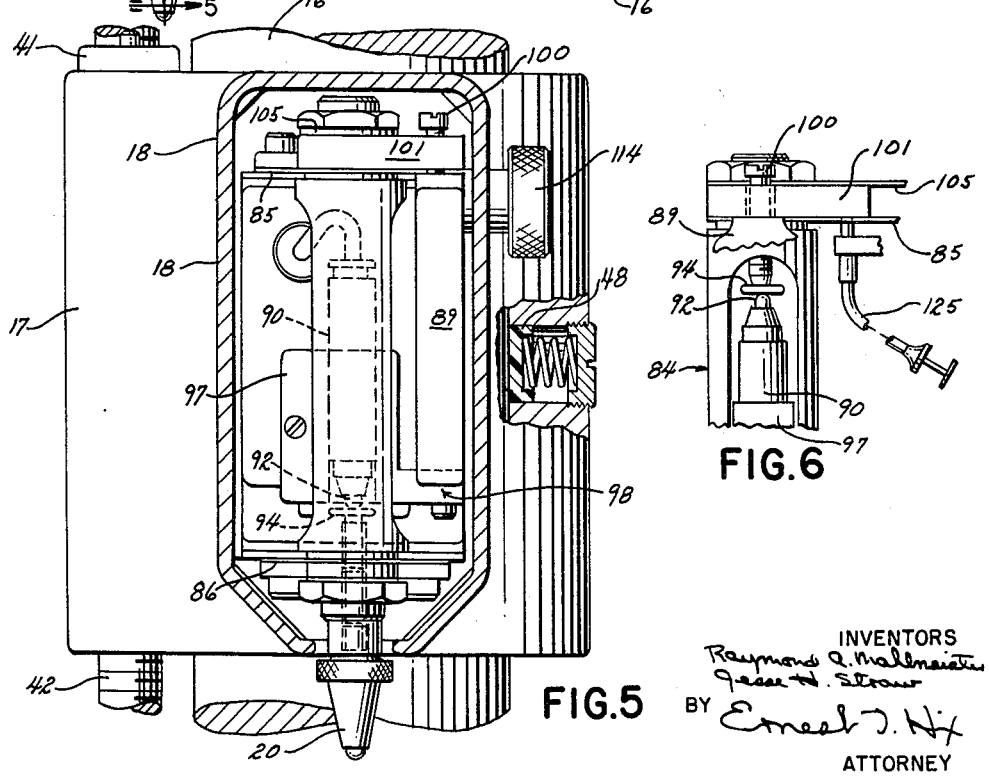
Figure 6:
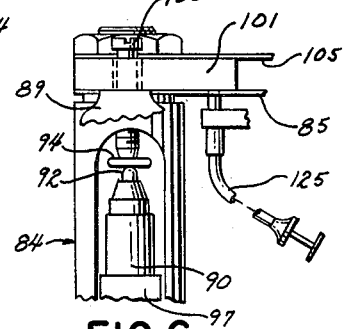

Figure 2 shows the base of the instrument of Figure 1 partially broken away to section taken on line 2—2 of Figure 3, Figure 3 is a front view of the comparator of Figure 1, Figure 4 illustrates in partial central section the gage head of the instrument and its supporting structure, Figure 5 is a sectional view taken on line 5—5 of Figure 4, Figure 6 is a fragmentary illustration of a modification of the gage head of Figure 4, Figure 7 is a view similar to that of Figure 5 but with a modified support for one of the gage head components.

Figure 8:
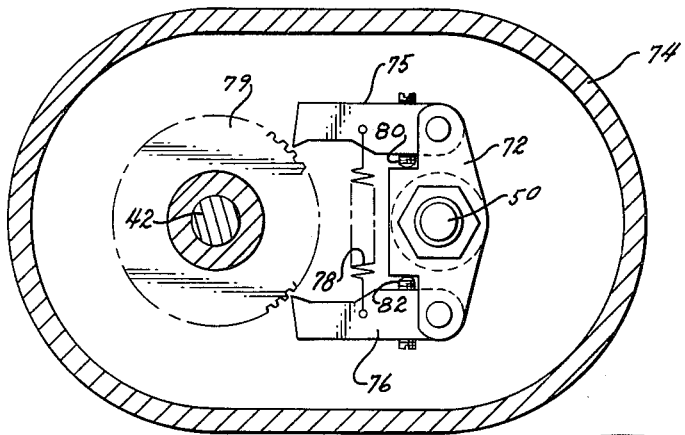
Figure 9:
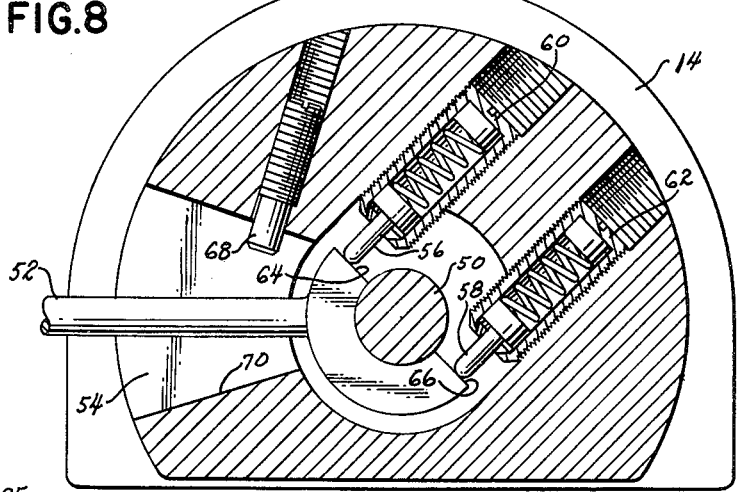
Figure 10:
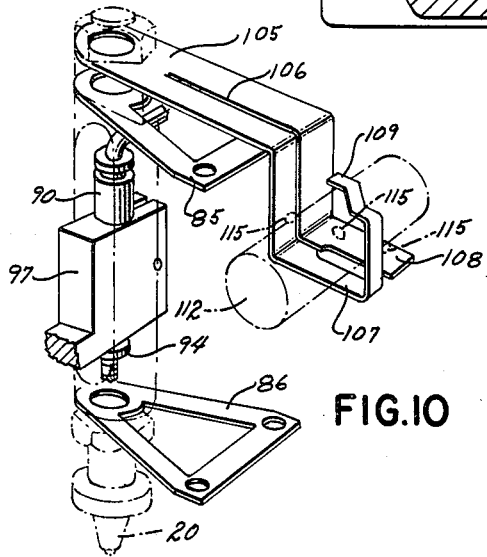

Figure 8 is a sectional view taken on line 8—8 of Figure 3 showing a portion of the gage head adjustment structure, Figure 9 is a sectional view taken on line 9—9 of Figure 3, and Figure 10 is a fragmentary perspective view of a portion of the gaging structure of the gage head.

The comparator of this invention is of the type particularly useful in gage laboratories with controlled atmospheres for measuring articles of high precision such as gage blocks and the like. Such instruments commonly operate on a comparator principle in which they are initially set-up or adjusted with master references so that a reference indication is obtained. This reference indication is usually a zero reading on the associated meter. After preliminary set-up adjustments have been made the article to be measured is then substituted in gaging position and deviations of the meter from the reference reading obtained indicate deviations in dimension of the particular article then being measured.

The present comparator has features of rugged and simple construction which makes possible measurements of the highest precision. Further it provides adjustments by which the preliminary set-up procedure can be carried out rapidly and with precision, thus reducing the overall time required for gaging.

The comparator includes a base above which extends a rigid gage head supporting column and on which is mounted an article-carrying table. The base in such instruments is commonly of a heavy casting and the present comparator provides fine and coarse adjustments in the base for positioning the table and an article carried thereon. Provision of these adjustments in the base of the comparator insures that they are rigidly supported and that deflections from adjustment pressures such as the application of the operator's hand do not affect the gaging accuracy. The gage head of the present invention also has features for adjustment and precise operation.

It is particularly important when gaging a large number of articles such as a gage block set that time for adjustment in measuring each of the articles be minimized. For example, gage blocks included in the usual set differ by certain steps or increments of dimension. The present invention provides a unique adjustment for positioning the gage head along its supporting column through precise increments of predetermined magnitude. Thus for example in going from a smaller block to a larger block in sequentially gaging a gage block set the operator simply, through the unique adjustment provided, raises the gage head by the difference in dimension. Then only a refinement is required for the next gaging operation.

The comparator instrument 12 of Figure 1 includes a base 14 supporting a work carrying table or anvil 15. A column 16 extending vertically from base 14 at one side of table 15 has a support 17 slidable therealong carrying a gage head 18. A movable contactor 20 extends below gage head 18 and controls a gaging cartridge, later described, connected to an indicating instrument 21.

As seen in Figures 2 and 3 table 15 is pivotally supported adjacent its forward edge by half spherical segments 22 seated in the upper surface of base 14. Pin 24 prevents lateral shifting of table 15. The clearance between table 15 and pin 24 is exaggerated in Figure 2.

Fine and coarse pivoting adjustments of table 15 relative to base 14 and gage head 18 are provided through movements of lever 26 supported in base 14 and cooperating with follower 27 extending upward into engagement with table 15. Lever 26 is supported by cam 30 and eccentric 31 rotatably carried in base 14 and engaging lever 26 at respectively greater and smaller distances from the effective location of follower 27. Spring assemblies 28 urge lever 26 into engagement with cam 30 and eccentric 31 and guide surfaces in base 14 are provided to locate lever 26 in its vertical movements.

As cam 30 is rotated through either of knobs 34 lever 26 is swung about eccentric 31 and extremely fine movements of table 15 for precisely positioning an article carried thereby in engagement with contactor 20. Cam 30 has an extremely gentle rise and the proximity of follower 27 to the effective pivot center further reduces the resulting movement of table 15. Rotations of eccentric 31 through knob 36 act almost directly on follower 27 for coarse adjustments of table 15 and articles carried thereby.

Base 14 is fashioned as a heavy and extremely rigid casting. Thus the provision of knobs 34 and 36 and the fine and coarse adjustment structure in this base insures that deflections due to pressure of the operator's hand and the like do not occur.

Support 17 is closely journaled on column 16 and is rigidly guided thereby to carry gage head 18 for vertical adjustments relative to table 15 and the articles to be gaged. A nut 40 is held fixed to support 17 by clamping plate 41 (see Figure 3). Adjustment screw 42 extending vertically along column 16 is threaded within nut 40. The upper end of screw 42 is held against endwise movement relative to base 14 and for free rotation by a conventional coupling provided at 44 but not shown in detail. Crank 46 connected to the upper end of screw 42 serves to rotate the screw for vertical adjustments of support 17 and gage head 18 along column 16. A spring-urged slider 48 (see Figure 5) maintains the side of column 16 adjacent screw 42 firmly in engagement with support 17 to prevent cocking thereof during adjustments. Thus gage head adjustments are made smoothly and with precision.

A shaft 50 extends vertically within column 16 coaxially therewith. An actuating lever 52 extends radially from shaft 50 at its lower end outward through an opening 54 provided in the supporting structure for column 16.

Plungers 56 and 58 of spring units 60 and 62 cooperate with faces 64 and 66 to resiliently maintain lever 52 in a centered position. Adjustable stop 68 threaded in the support structure for column 16 cooperates with the opposing face 70 of opening 54 to adjustably determine the overall swinging movement of lever 52. Relative adjustment of units 60 and 62 determines the centered position.

An arm 72 fixed to the upper end of shaft 50 within housing 74 pivotally carries pawls 75 and 76 at its opposite ends. Pawls 75 and 76 are spring-urged toward one another by spring 78 and cooperate with a ratchet wheel 79 fixed to the upper end of screw 42.

Set screws 80 and 82 respectively threaded through pawls 75 and 76 cooperate with opposing stop structure on arm 72 to determine the inward positions of the pawls. Thus with lever 52 in its centered position the pawls are held clear of ratchet wheel 79 and crank 46 can be freely turned for gage head adjustments. However when the operator grasps lever 52 and operates it through a stroke in a counter-clockwise direction as seen in Figure 9 pawl 75 is effective to engage ratchet wheel 79 and adjust gage head 18 through an increment upward. Operation of lever 52 in the reverse direction renders pawl 76 effective and the gage head is lowered one increment. Screws 80 and 82 also determine which ratchet tooth is initially picked up to start rotation of screw 42. The structure associated with lever 52 determines the extent of movement from those points in each direction. The number of teeth on wheel 79 and the pitch of screw 42 determine the basic accuracy of the incremental adjustments.

Thus when the operator is gaging a series of articles such as a gage block set of known nominal differences in dimension he simply operates lever 52 through the desired number of reciprocations to obtain a known adjustment of the gage head. In one commercial application actuation of lever 52 through a stroke in either direction from its center position gives an adjustment of .001 inch. Following this such refinements as are necessary can be accomplished through fine and coarse adjustment knobs 34 and 36.

A gage head particularly adapted for use in the present comparator is shown in Figures 4 and 5. It includes a work contactor assembly 84 supported by spring leaves 85 and 86 extending from a projection 89 forming a part of support 17. Gaging cartridge 90 supported centrally with clearance relative to assembly 84 has a contacting element 92 engaging a pad 94 forming a part of assembly 84. A holder 97 fixed at 98 (see Figure 5) to support projection 89 mounts cartridge 90 in gaging position. When contactor 20 engages an article supported on table 15 assembly 84 will move vertically and the engaging element 92 of cartridge 90 will be actuated to provide a gage signal indicated on instrument 21. A cartridge which could be so employed is illustrated and described more particularly in Patent No. 2,833,046, issued May 6, 1958. Screw 100 threaded into support projection 89 cooperates with projection 101 of assembly 84 to limit its up and down movements.

A spring arm 105 fixed to the upper end of assembly 84 extends to the rear within the housing of head 18. This arm 105 is shown in more detail in Figure 10. Arm 105 is split at 106 and bent as shown to provide a lower spring surface 107 and a wider lower spring surface 108 adjacent thereto. The portion of arm 105 which includes surface 107 extends upward and back to provide an upper spring surface 109 which is vertically between surfaces 107 and 108. A cylinder 112 rotatable through knob 114 carries projections such as those indicated at 115 situated in the planes of spring surfaces 107, 108 and 109. The cooperation of projections 115 with surfaces 107 to 109 provides a means of adjusting the gaging pressure of contactor 20.

A projection 115 is disposed in the plane of each of surfaces 107, 108 and 109 and the projections are at 90 degrees to one another about cylinder 112. In a first position of knob 114 upper surface 109 is engaged to counterbalance some of the weight of assembly 84 and give the lightest gaging pressure. The next degree of gaging pressure of contactor 20 is obtained with projections 115 clear of the spring surfaces and successively greater pressures with surfaces 107 and 108 engaged in turn.

The gage head construction of Figure 7 is generally the same as that of Figures 4 and 5 previously described with the exception that it provides a second form of fine adjustment for use with comparators having a conventional work support. A modified holder 117 is provided which includes a reduced leaf section 118. Screw 120 adjusted by knob 121 is threaded through support projection 89 and engages holder 117. Thus upon rotation of knob 121 minor changes in the positional relationship between the gage cartridge and assembly 84 are provided for extremely fine adjustment of the indication obtained.

In routine gaging applications the article to be gaged is placed on table 15 and is moved therealong into engagement with contactor 20 to urge assembly 84 upward as the article is inserted under the contactor. However, it is particularly beneficial to lower the contactor into engagement with gage blocks. Thus in Figure 6 a cable actuator 125 similar to a camera release cooperates with projection 101 on assembly 84 to lift the assembly for insertion of a block following which contactor 20 is lowered into engagement with the block. The movable element 92 of cartridge 90 is spring-urged outward and it is desirable that the gaging movement (upward when an article is slid under contactor 20 and downward when actuator 125 is used) be against this spring force so that positive displacement of the element by the work occurs in each instance. For that reason in the arrangement of Figure 6, cartridge 90 is inverted.

Thus it is seen that a comparator instrument has been provided which is particularly adaptable for gaging operations of the highest precision. It has features in construction for extreme rigidity and for more accurate gaging results. Readily accessible and easy manipulated adjustments are provided making it of more universal application and minimizing the necessary time for set-up and other adjustment procedures.

While the forms of apparatus herein described constitute preferred embodiments of the invention, it is to be understood that the invention is not limited to these precise forms of application and that changes may be made therein without departing from the scope of the invention.

What is claimed is:

1. A precision comparator for checking article dimensions comprising a base, a table for supporting an article to be gaged, a gage head having a movable work contactor for positioning engagement with an article to be gaged, support means carrying said table and said gage head on said base for relative adjustment, drive means operatively connected to said support means for relatively positioning said table and gage head, actuating means operatively connected to said drive means for incremental adjustments thereof, and control means for operating said actuating means selectively in reverse directions for incremental equidistant step-by-step relative adjustments between said table and said gage head.

2. A precision comparator for checking article dimensions comprising a base, a table carried on said base for supporting an article to be gaged, a vertical column rigidly supported by said base at one side of said table, a support member guided by said column for movement therealong toward and from said table, a gage head carried by said support member, said gage head having a movable work contactor for positioning engagement with an article to be gaged, drive means for positioning said head along said column, actuating means operatively connected to said drive means and producing incremental adjustments thereof for predetermined displacements of said gage head along said column, and control means for operating said actuating means selectively in reverse directions for incremental up or down equidistant step-by-step movements of said gage head.

3. A precision comparator for checking article dimensions comprising a base, a table carried on said base for supporting an article to be gaged, a vertical column rigidly supported by said base at one side of the said table, a support member guided by said column for movement therealong toward and from said table, a gage head carried by said support member, said gage head having a movable work contactor for positioning engagement with an article to be gaged, nut means on said support member, an adjusting screw threaded within said nut means and extending vertically along said column, means at one end of said screw holding it against endwise movement but free for rotation relative to said base, first actuating means operatively connected to said screw adjustable for continuous rotation thereof for desired vertical displacements of said support member and said gage head along said column, and second actuating means operatively connected to said screw and operative independently of said first means and producing equal step-by-step rotations of said screw for incremental adjustments of said gage head.

4. A precision comparator for checking article dimensions comprising a base, a table carried on said base for supporting an article to be gaged, a vertical column rigidly supported by said base at one side of said table, a support member guided by said column for movement therealong toward and from said table, a gage head carried by said support member, said gage head having a movable work contactor for positioning engagement with an article to be gaged, nut means fixedly mounted in said support member, a driving screw threaded within said nut means and extending vertically along said column, means at one end of said screw holding it against endwise movement but for free rotation relative to said base whereby upon rotation of said screw said support is vertically moved along said column, a crank connected to said screw for rotation thereof for displacements of said support and gage head relative to said table, and a ratchet drive operatively connected to said screw for predetermined rotations thereof and incremental vertical movements of said gage head to accommodate differences between dimensions of articles to be gaged.

5. A precision comparator as set forth in claim 4 wherein said ratchet drive includes a ratchet wheel connected to said screw and a lever and pawl drive therefor, whereby upon oscillation of said lever repeated incremental adjustments of said gage head through equal steps is obtained.

6. The precision comparator as set forth in claim 5 further comprising means maintaining said pawl drive clear of said ratchet wheel during inoperative periods of incremental adjustment, whereby said crank is freely rotatable independently thereof.

7. A precision comparator as set forth in claim 4 wherein said ratchet drive includes a ratchet wheel operatively connected to said screw, a dual pawl actuating assembly, and an actuating lever for said pawl assembly oscillatable in opposite directions from a reference position for incremental adjustments of said gage head in either direction along said column.

8. A precision comparator for checking article dimensions comprising a base, a table carried on said base for supporting an article to be gaged, a vertical column rigidly supported by said base at one side of said table, a support member guided by said column for movement therealong toward and from said table, a gage head carried by said support member, said gage head having a movable work contactor for positioning engagement with an article to be gaged, nut means fixed to said support member, a driving screw threaded within said nut means and extending vertically along said column, means at one end of said screw fixing it against endwise movement while free for rotation relative to said base, crank means connected to the upper end of said screw for rotation thereof and vertical movements of said support and gage head along said column, a shaft extending coaxially within said column, a lever operatively connected to said shaft at the lower end thereof for obtaining predetermined rotations thereof, and ratchet drive means between the upper end of said shaft and said screw, whereby predetermined incremental adjustments of gage head position can be obtained through actuations of said lever.

9. A precision comparator for checking article dimensions comprising a base, a table adjustably carried on said base for supporting an article to be gaged, a vertical column rigidly supported by said base at one side of said table, a support member guided by said column for movement therealong toward and from said table, a gage head carried by said support member, said gage head having a movable work contactor for positioning engagement with an article to be gaged, first coarse adjustment means cooperating between said base and said table for coarse positioning of said table and an article carried thereby relative to said gage head, second fine adjustment means cooperating between said base and said table for fine adjustment of the table and article, drive means for positioning said head along said column, actuating means operatively connected to said drive means for incremental adjustment thereof for predetermined displacements of said gage head along said column, and control means associated with said actuating means for determining the magnitude of said displacements.

10. A precision comparator for checking article dimensions comprising a base, a table carried on said base for supporting an article to be gaged, a vertical column rigidly supported by said base at one side of said table, a support member guided by said column for movement therealong toward and from said table, a gage head carried by said support member, said gage head having a movable work contactor for positioning engagement with an article to be gaged, means cooperating between said base and said table supporting said table for pivotal movements for vertical positioning of an article carried thereby relative to said gage head, a lever in said base, follower means cooperating between said lever and said table for positioning of said table upon movements of said lever, first and second cam means cooperating to support said lever by engagement therewith at respectively greater and smaller distances from said follower means, actuating means for said first cam means whereby said lever is pivoted about the second cam means and fine adjustments of said table are obtained, actuating means for said second cam means for pivoting said lever about said first cam means to obtain coarse table adjustments, drive means for positioning said head along said column, and actuating means operatively connected to said drive means for incremental adjustment thereof for predetermined displacement of said gage head along said column.

11. A precision comparator for checking article dimensions comprising a base, a table carried on said base for pivoting movement to vertically adjust the position of an article carried thereby, a vertical column rigidly supported by said base at one side of said table, a support member guided by said column for movement therealong toward and from said table, a gage head carried by said support member, said gage head having a movable work contactor for positioning engagement with an article to be gaged, first manually adjustable actuating means cooperating between said base and said table for fine pivoting movement thereof and fine positioning of an article relative to said gage head, and second manually adjustable means cooperating between said base and said table for obtaining coarse pivoting movements of said table and coarse positioning of an article to be gaged.

12. A precision comparator for checking article dimensions comprising a base, a table carried on said base for supporting an article to be gaged, a vertical column rigidly supported by said base at one side of said table, a support member guided by said column for movement therealong toward and from said table, a gage head carried by said support member, said gage head having a movable work contactor for positioning engagement with an article to be gaged, means cooperating between said base and said table supporting said table for pivoting movement to adjust the position of an article carried thereby relative to said gage head, a lever in said base, follower means cooperating between said lever and said table for obtaining pivoting adjustments thereof, first and second cam means supporting said lever by engagement therewith at respectively greater and smaller distances from said follower means, actuating means for said first cam means to adjust said lever about said second cam means and obtain fine table and article adjustments, and actuating means for said second cam means for pivoting said lever about said first cam means and obtaining coarse vertical article adjustments.

13. A precision comparator for checking article dimensions comprising a base, a table carried on said base for supporting an article to be gaged, a vertical column rigidly supported by said base at one side of said table, a support member guided by said column for movement therealong toward and from said table, a gage head carried by said support member, said gage head having a movable work contactor for positioning engagement with an article to be gaged, means in said gage head carrying said work contactor including bias means urging said contactor downward toward said table, adjustment means cooperating with said bias means for precisely determining the gaging pressures of said work contactor, and incrementally adjustable positioning means cooperating between said gage head and said base for obtaining predetermined displacements of said gage head along said column.

14. A precision comparator for checking article dimensions comprising a base, a table carried on said base for supporting an article to be gaged, a vertical column rigidly supported by said base at one side of said table, a support member guided by said column for movement therealong, a gage head carried by said support member, said gage head including a work contactor supported for vertical movements and positioning upon engagement with an article mounted on said table, a spring arm fixedly connected to said work contactor, cam means in said gage head cooperating with said spring arm, adjustable means for positioning said cam means to vary the effective resiliency of said arm and adjust the gaging pressures of said contactor, and actuating means cooperating between said base and said gage head for obtaining incremental gage head movements in equal repeated steps along said column for precise positioning thereof in accordance with the relative dimensions of articles to be gaged.

15. A precision comparator for checking article dimensions comprising a base, a table on said base for supporting an article to be gaged, a vertical column extending above said base, a support movable along said column, a gage head carried by said support, a contactor assembly in said gage head including a work contactor at its lower end, parallel spring blades connected between said support and said assembly carrying the assembly for vertical movements, gaging means cooperating between said support and said contactor assembly responsive to movement of said assembly upon engagement of said contactor with an article carried on said table, a resilient spring arm attached to said assembly extending therefrom, cam means on said support cooperating with said spring arm for adjusting the direction and magnitude of pressure exerted thereby upon said assembly, adjustment means for said cam means to vary the gaging pressures, actuating means cooperating between said base and said support for vertical movements of said gage head along said column, and manually controlled means for obtaining predetermined incremental movements of said gage head along said column for use in rapidly setting up the comparator for articles of different dimensions.

16. A comparator as set forth in claim 15 including support means for said gaging means including a reduced resilient section, and manually adjustable screw means carried by said support in engagement with said supporting means for adjusting said gaging means about said resilient section for fine adjustments of the comparator for gaging.

References Cited in the file of this patent

UNITED STATES PATENTS

| 1,422,161 | Woodrow | July 11, 1922 |
| 2,603,876 | Wedin | July 22, 1952 |
| 2,694,805 | Jordan | Nov. 16, 1954 |
| 2,833,046 | Jeglum | May 6, 1958 |